US012601380B2

(12) United States Patent
Ichikawa et al.

(10) Patent No.: US 12,601,380 B2
(45) Date of Patent: Apr. 14, 2026

(54) PROPELLER SHAFT

(71) Applicant: Hitachi Astemo, Ltd., Hitachinaka (JP)

(72) Inventors: Shoichi Ichikawa, Hitachinaka (JP);
Daiki Tsutsumi, Hitachinaka (JP);
Toshiyuki Masuda, Hitachinaka (JP);
Kenichiro Ishikura, Hitachinaka (JP)

(73) Assignee: HITACHI ASTEMO, LTD.,
Hitachinaka (JP)

( * ) Notice: Subject to any disclaimer, the term of this
patent is extended or adjusted under 35
U.S.C. 154(b) by 230 days.

(21) Appl. No.: 18/277,945

(22) PCT Filed: Dec. 16, 2021

(86) PCT No.: PCT/JP2021/046411
§ 371 (c)(1),
(2) Date: Aug. 18, 2023

(87) PCT Pub. No.: WO2022/176362
PCT Pub. Date: Aug. 25, 2022

(65) Prior Publication Data
US 2024/0133468 A1     Apr. 25, 2024
US 2024/0229936 A9     Jul. 11, 2024

(30) Foreign Application Priority Data

Feb. 22, 2021     (JP) ................................. 2021-026516

(51) Int. Cl.
F16D 3/84          (2006.01)
F16C 33/76         (2006.01)
(Continued)

(52) U.S. Cl.
CPC ................ F16D 3/84 (2013.01); F16C 33/76
(2013.01); F16C 33/805 (2013.01); B60K
17/22 (2013.01); F16C 2326/06 (2013.01)

(58) Field of Classification Search
CPC ....... B60K 17/22; B60K 17/24; F16C 27/066;
F16C 33/76; F16C 33/805; F16C 35/047;
(Continued)

(56) References Cited

U.S. PATENT DOCUMENTS 2,927,825 A     3/1960  Stone
4,364,613 A    12/1982  Mangiavacchi
(Continued)

FOREIGN PATENT DOCUMENTS

JP       S59-231209 A    12/1984
JP        62071725 A  *  4/1987 ............ F16C 27/066
(Continued)

OTHER PUBLICATIONS

International Preliminary Report on Patentability and Written Opin-
ion dated Aug. 31, 2023 issued in International Application No.
PCT/JP2021/046411, with English translation, 14 pages.
(Continued)

*Primary Examiner* — Josh Skroupa
(74) *Attorney, Agent, or Firm* — FOLEY & LARDNER
LLP

(57)          ABSTRACT

A water-impermeable cover is provided with an opening part
extending so as to approach an opening part of a holding ring
of a propeller shaft. The water-impermeable cover is pro-
vided at a position on the opening-part side of the holding
ring. The water-impermeable cover is fixed in a position on
the opening-part side of the holding ring of the stub shaft.
The opening part of the water-impermeable cover is
extended so as to approach the opening part of the holding
ring.

19 Claims, 7 Drawing Sheets

(51) Int. Cl.
   *F16C 33/80*     (2006.01)
   *B60K 17/22*     (2006.01)
(58) Field of Classification Search
   CPC ...... F16C 35/063; F16C 2326/06; F16D 3/84;
            F16D 3/841; F16D 3/843; F16D 3/845;
            F16D 3/848; F16D 2003/846; F16J 15/52;
                                      Y10T 403/17
   USPC ........... 464/170, 173, 178; 403/23; 384/484,
                                            384/536
   See application file for complete search history.

(56)                References Cited

U.S. PATENT DOCUMENTS 4,551,116 A     11/1985  Krude
   6,913,105 B2 *   7/2005  Masuda ................. B60K 17/24
                                                     464/167

8,628,250 B2 *   1/2014  Oinuma ................ F16C 27/066
                                                     384/536
   9,511,664 B2 * 12/2016  Mori ...................... B60K 17/24
   2008/0293502 A1   11/2008  Oinuma et al.

FOREIGN PATENT DOCUMENTS

JP        H04-034005 B2    6/1992
   JP        2007-106359 A    4/2007
   JP        2009-006990 A    1/2009
   JP        2016-124422 A    7/2016
   JP          6527332 B2 *   6/2019  ............. F16C 27/066

OTHER PUBLICATIONS

International Search Report dated Mar. 1, 2022 issued in International Application No. PCT/JP2021/046411, with English translation, 5 pages.

* cited by examiner

FIG. 2

PROPELLER SHAFT

TECHNICAL FIELD

The present invention relates to a propeller shaft for an automobile, especially a propeller shaft supported by a vehicle body via a center bearing.

BACKGROUND ART

Patent Document 1, JP 2016-124422 A, discloses a supporter for a propeller shaft. The supporter is mounted to a bottom face of a vehicle body of an automobile, and elastically supports a center bearing mounted to the propeller shaft.

The supporter in Patent Document 1 includes an elastic support member, an outer collar, an inner collar, and a press collar. The elastic support member has an annular shape with a cross section bent into a substantially U shape. The outer collar is joined to an outer periphery of the elastic support member by vulcanization adhesion. The inner collar is joined to an inner periphery of the elastic support member by vulcanization adhesion, and is press-fitted to an outer ring of the center bearing. The press collar is fitted inside the inner collar, and regulates axial movement of the outer ring of the center bearing.

This center bearing supporter elastically supports the center bearing under the vehicle body via the elastic support member made of a rubber-like elastic material, by fitting the outer collar to a bracket under the vehicle body and fitting the inner collar to the outer ring of the center bearing mounted to an outer periphery of the propeller shaft. The elastic support member performs vibration absorbing and cushioning between the propeller shaft and the vehicle body during vehicle traveling.

PRIOR ART DOCUMENT(S)

Patent Document(s)

Patent Document 1: JP 2016-124422 A

SUMMARY OF THE INVENTION

Problem(s) to be Solved by the Invention

The propeller shaft supporter disclosed in Patent Document 1 includes a labyrinth seal structure between an inner peripheral wall of the press collar and an end face of a dust cover extending into the press collar. The press collar is fixed to an inner periphery of the inner collar, and is structured to rotate together with the propeller shaft. The end face of the dust cover is inserted in a U-shaped interior space of the press collar so as to form the labyrinth seal structure.

However, the labyrinth seal structure of the propeller shaft supporter according to Patent Document 1 includes a gap between the inner peripheral wall of the press collar and the end face of the dust cover. This may allow muddy water etc. having flown to the gap to intrude into an interior of the center bearing.

In view of the foregoing, it is desirable to provide a propeller shaft structured to suppress muddy water etc. from intruding into an interior of a center bearing.

Means for Solving the Problem(s)

According to one aspect of the present invention, a propeller shaft for transmitting drive force from a drive source includes: a shaft including a first end and a second end; a center bearing including: an inner ring fixed to an outer peripheral surface of the shaft; a rolling body disposed in an outer circumferential side with respect to the inner ring; and an outer ring disposed in an outer circumferential side with respect to the rolling body; an inner collar that has a tubular shape, and extends along a rotational axis of the shaft so as to surround the outer peripheral surface of the shaft, and retains the outer ring of the center bearing; a press collar including a first annular part, a second annular part, and a third annular part, wherein: the first annular part is disposed in an annular gap formed between the outer peripheral surface of the shaft and an inner peripheral surface of the inner collar, and is fixed to the inner peripheral surface of the inner collar, and extends in a direction to approach the center bearing along the shaft, when viewed in a direction of the rotational axis of the shaft; the second annular part extends continuously with the first annular part, in a direction to approach the shaft; and the third annular part extends continuously with the second annular part, in a direction to go away from the center bearing along the shaft; and a dust cover including a cover first part, a cover second part, and a cover third part, wherein: the cover first part is disposed on the outer peripheral surface of the shaft oppositely to the center bearing across the press collar, and is fixed to the outer peripheral surface of the shaft, and extends in a direction to approach the press collar along the shaft, when viewed in the direction of the rotational axis of the shaft; the cover second part extends continuously with the cover first part, in a direction to go away from the shaft; and the cover third part extends continuously with the cover second part, in a direction to approach the press collar along the shaft. The cover third part of the dust cover extends to a space defined between the first annular part and the third annular part of the press collar. The third annular part of the press collar extends to a space defined between the cover first part and the cover third part of the dust cover. The propeller shaft further includes a water-shielding cover including a first water-shielding part, a second water-shielding part, and a third water-shielding part, wherein: the first water-shielding part is disposed on the outer peripheral surface of the shaft oppositely to the press collar across the dust cover, and is fixed to the outer peripheral surface of the shaft, and extends along the shaft, when viewed in the direction of the rotational axis of the shaft; the second water-shielding part extends continuously with the first water-shielding part, in a direction to go away from the shaft; and the third water-shielding part extends continuously with the second water-shielding part, in a direction to approach the dust cover along the shaft, and partially covers the cover second part and the cover third part of the dust cover from outside.

Effect(s) of the Invention

According to the above aspect of the present invention, the water-shielding cover is fixed to the stub shaft at a position to face an opening of the press collar across the dust cover, and includes an opening extending to approach the opening of the press collar. This serves to suppress muddy water etc. having obliquely flown toward the opening of the press collar from intruding into the opening of the press collar, and thereby suppress muddy water etc. from intruding into an interior of the center bearing.

BRIEF DESCRIPTION OF THE DRAWINGS

FIG. 2 is an enlarged longitudinal sectional view enlarging a supporter for the propeller shaft and a vicinity thereof.

MODE(S) FOR CARRYING OUT THE INVENTION

The following details embodiments of the present invention with respect to the drawings. The present invention is not limited to the following embodiments, and includes various aspects of modification and application within scope of technical ideas of the present invention.

Figure 1:
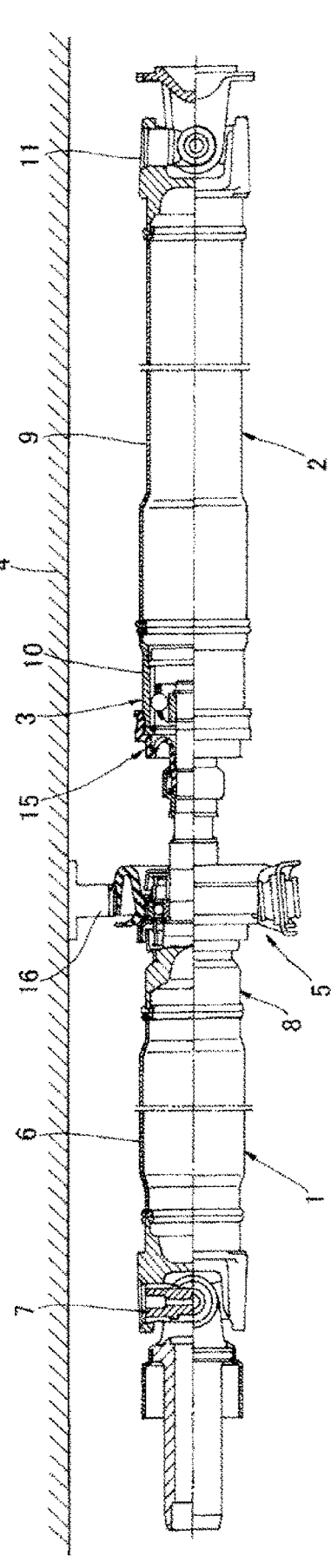
FIG. 1 is an external appearance view of a propeller shaft to which the present invention is applied.
Figure 2:
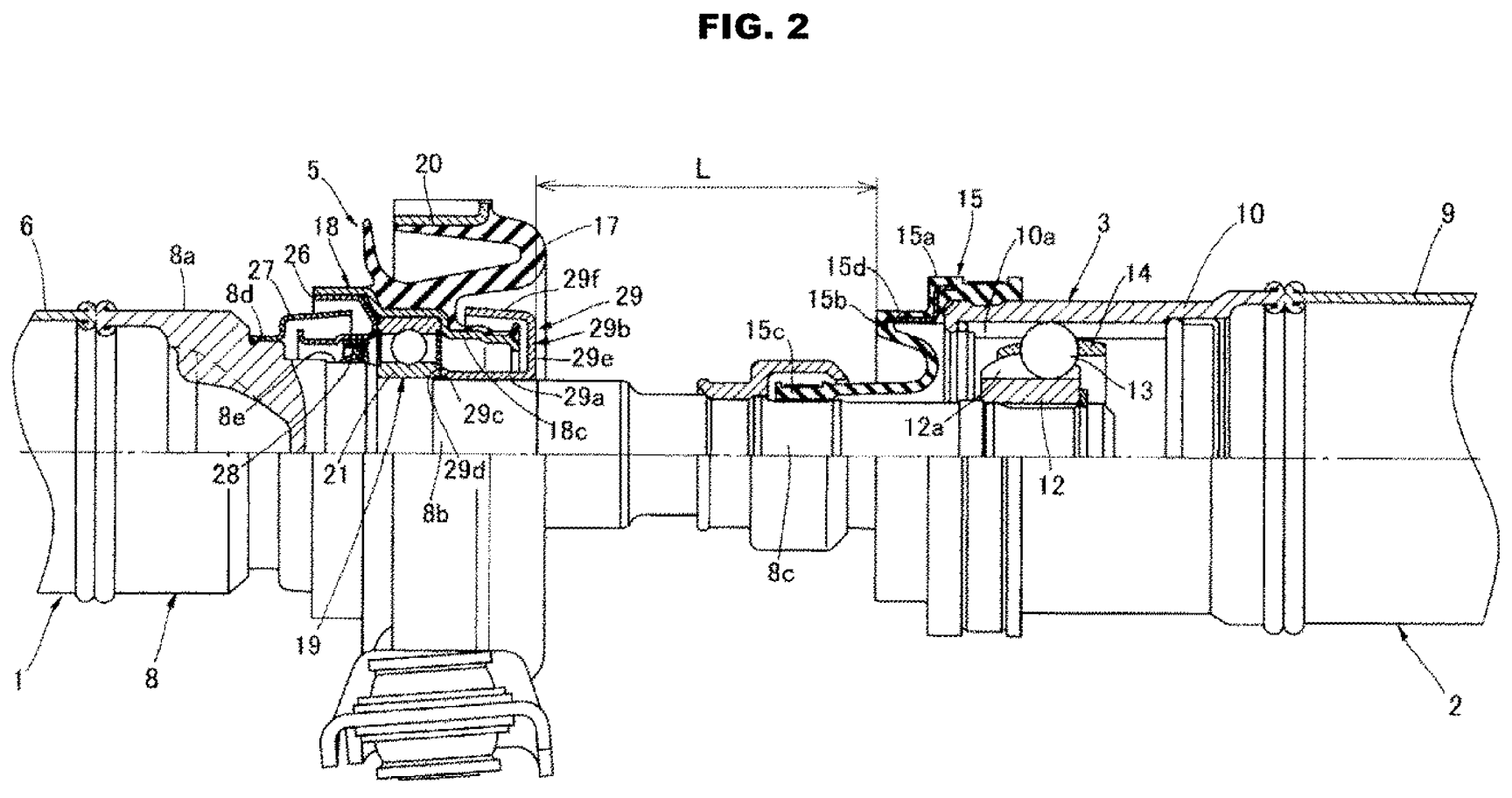
Figure 3:
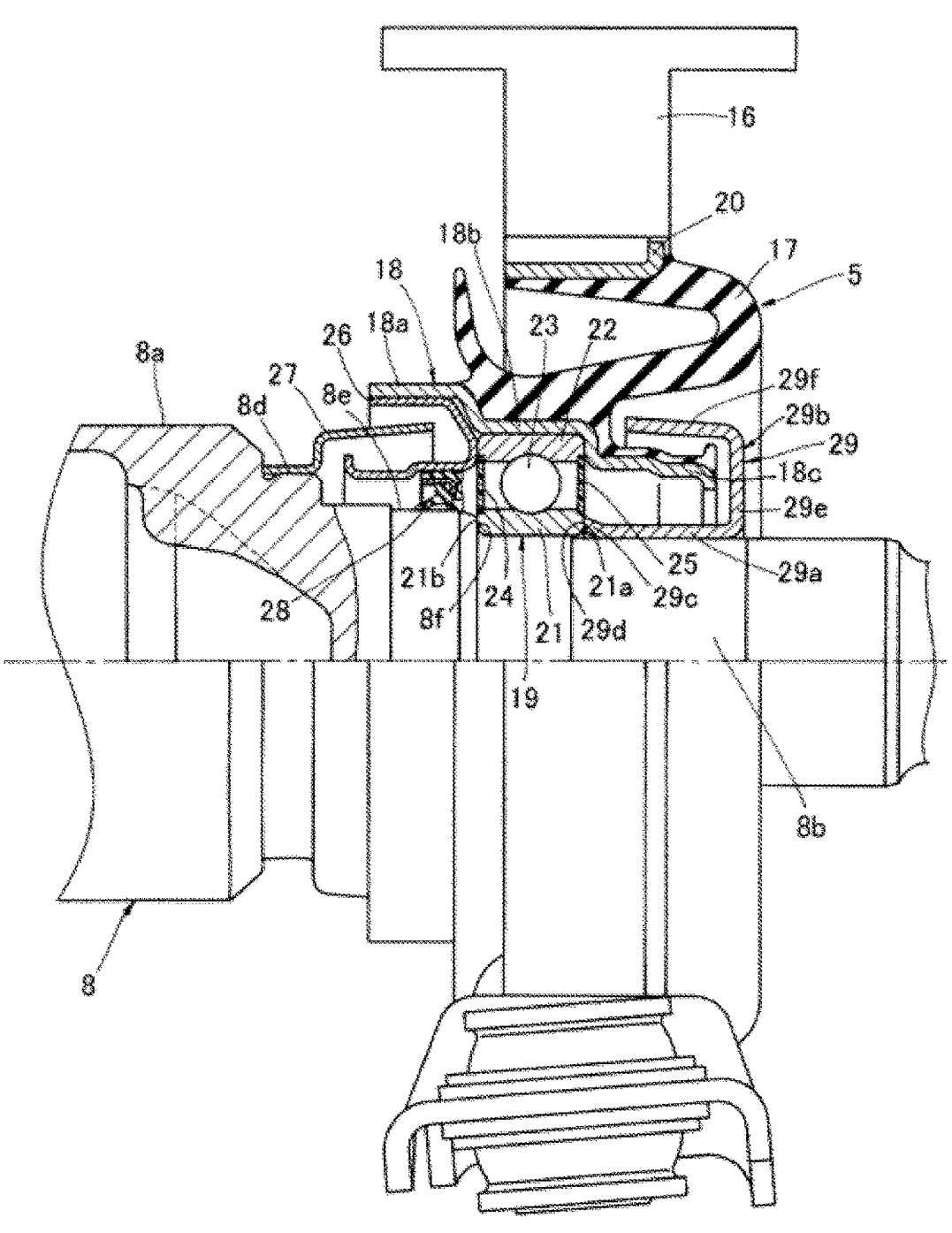
FIG. 3 is an enlarged longitudinal sectional view further enlarging the supporter for the propeller shaft and the vicinity thereof shown in FIG. 2.

Before explaining the present invention, the following describes configurations of a propeller shaft serving as a basis of the present invention, with reference to FIGS. 1 to 3. This propeller shaft described below has been already presented by the applicant of the present invention.

As shown in FIG. 1, the propeller shaft being an application target of the present invention is structured for an automobile driven with a drive system such as a four-wheel-drive system or a front-engine, rear-wheel-drive system, and is mainly composed of a driving shaft 1, a driven shaft 2, a constant-velocity joint 3, and a supporter 5. Driving shaft 1 is connected to a transmission combined with a drive source such as an internal combustion engine. Driven shaft 2 is connected to a differential gear. Constant-velocity joint 3 connects driving shaft 1 and driven shaft 2. Supporter 5 is disposed on driving shaft 1 so as to face constant-velocity joint 3, and is fixed under a floor member of the automobile such as a cross member 4.

Driving shaft 1 includes a driving-side tube 6, a Cardan joint 7, and a stub shaft 8. Driving-side tube 6 is made of a steel. Cardan joint 7 is axially fixed to a front end of driving-side tube 6 by welding. Stub shaft 8 is axially fixed to a rear end of driving-side tube 6 by welding.

Driven shaft 2 includes a driven-side tube 9, a constant-velocity joint casing 10, and a Cardan joint 11. Driven-side tube 9 is made of a steel. Constant-velocity joint casing 10 is axially fixed to a front end of driven-side tube 9 by welding, and receives an end of stub shaft 8 inserted inside the constant-velocity joint casing 10. Cardan joint 11 is axially fixed to a rear end of driven-side tube 9 by welding.

As shown in FIGS. 2 and 3, stub shaft 8 is made of a ferrous metal, and is shaped to be stepwise in outer diameter, and includes a stub large-diameter section 8a, a stub middle-diameter section 8b, and a stub small-diameter section 8c. Stub large-diameter section 8a is fixed to the rear end of driving-side tube 6. Stub shaft 8 gradually decreases in outer diameter as going axially from stub large-diameter section 8a to stub small-diameter section 8c.

Stub shaft 8 further includes a stub second large-diameter step section 8d, a stub middle-diameter step section 8e, and a step surface 8f. Stub second large-diameter step section 8d is formed between stub large-diameter section 8a and stub middle-diameter section 8b, and is less in outer diameter than stub large-diameter section 8a and greater in outer diameter than stub middle-diameter section 8b. Stub middle-diameter step section 8e is formed between stub second large-diameter step section 8d and stub middle-diameter section 8b, and is less in outer diameter than stub second large-diameter step section 8d and greater in outer diameter than stub middle-diameter section 8b. Step surface 8f is formed between stub middle-diameter step section 8e and stub middle-diameter section 8b. In addition, stub small-diameter section 8c includes a tip extending outwardly and including an outer periphery to which an inner race 12 described below of constant-velocity joint 3 is fixed.

As shown in FIG. 2, constant-velocity joint 3 is mainly composed of constant-velocity joint casing 10, inner race 12, a plurality of torque-transmitting balls 13, and a cage 14. Constant-velocity joint casing 10 is fixed to the front end of driven shaft 2, and serves as an outer race having a substantially cylindrical shape. Inner race 12 is disposed inside the constant-velocity joint casing 10. Torque-transmitting balls 13 are disposed between constant-velocity joint casing 10 and inner race 12 so as to be rollable. Cage 14 retains torque-transmitting balls 13.

As shown in FIG. 2, constant-velocity joint casing 10 includes in its inner periphery a plurality of grooves 10a extending in the axial direction and arranged at substantially equal intervals in a circumferential direction around the axial direction. Inner race 12 includes an outer periphery facing the inner periphery of constant-velocity joint casing 10, and includes in this outer periphery a plurality of depressions 12a that extend in the axial direction and are arranged at substantially equal intervals in the circumferential direction so as to correspond to grooves 10a of constant-velocity joint casing 10.

Constant-velocity joint 3 includes an internal space filled with lubrication oil such as grease. This internal space is sealed with a boot 15 made of a rubber and mounted to a front end of constant-velocity joint casing 10.

Boot 15 is made of a rubber, and is shaped to be a cylinder stepwise in outer diameter, and includes a body 15a and a turn-up part 15c. Body 15a is fitted to an outer periphery of a tip of constant-velocity joint casing 10. Turn-up part 15c is formed by bending so as to have a shape of a turn-up or a cuff bent radially inwardly from a tip 15b of body 15a, and includes a tip fitted to the outer periphery of stub small-diameter section 8c of stub shaft 8. Boot 15 further includes a core 15d embedded inside body 15a.

As shown in FIGS. 2 and 3, supporter 5 is mainly composed of a mounting bracket 16, an elastic member 17, an inner collar 18, and a center bearing 19. Mounting bracket 16 is an annular member mounted to cross member 4 of the vehicle body. Elastic member 17 is fixed inside the mounting bracket 16. Inner collar 18 is a metallic support member fixed to an inner periphery of elastic member 17. Center bearing 19 is retained in an interior of inner collar 18.

Inner collar 18 has a tubular shape, and extends along a rotational axis of stub shaft 8 composing the shaft, and surrounds an outer peripheral surface of stub shaft 8. Thus, stub shaft 8 extends through the interior of inner collar 18, and forms an annular gap between the outer peripheral surface of stub shaft 8 and an inner peripheral surface of inner collar 18. This annular gap contains the center bearing 19 and a press collar 26.

Elastic member 17 is made of a rubber, and has a section having a horizontal U shape open toward a front of the vehicle. Elastic member 17 includes an outer peripheral surface joined to an inner peripheral surface of an annular press-fitted member 20 by vulcanization adhesion. Annular press-fitted member 20 is made of a metal, and is press-fitted and fixed to an inner peripheral surface of mounting bracket 16. Furthermore, elastic member 17 includes an inner peripheral surface joined to an outer peripheral surface of inner collar 18 by vulcanization adhesion.

Inner collar 18 is formed of a thin metal plate, and has a shape of a cylinder stepwise in outer diameter, and includes a large-diameter annular section 18a, a middle-diameter annular section 18b, and a small-diameter annular section 18c. Large-diameter annular section 18a is disposed around stub middle-diameter step section 8e of stub shaft 8. Middle-diameter annular section 18b is formed continuously with large-diameter annular section 18a, and is disposed around stub middle-diameter section 8b of stub shaft 8. Small-diameter annular section 18c is formed continuously with middle-diameter annular section 18b.

Center bearing 19 includes an inner ring 21, an outer ring 22, and a plurality of steel balls 23. Inner ring 21 is press-fitted to an outer periphery of stub middle-diameter section 8b of stub shaft 8. Outer ring 22 is retained in an inner peripheral side of middle-diameter annular section 18b of inner collar 18. Steel balls 23 are rollably retained between a pair of arc-shaped retention grooves that are respectively centered in a pair of facing surfaces of inner ring 21 and outer ring 22. Center bearing 19 further includes oil seals 24 and 25 that are respectively mounted to first ends and second ends of inner ring 21 and outer ring 22 in their width direction.

Press collar 26 is press-fitted and fixed to an inner periphery of large-diameter annular section 18a of inner collar 18, and is open toward the front of the vehicle body. The opening of press collar 26 accepts a dust cover 27 that includes a second end extending to an internal space of the opening of press collar 26. Dust cover 27 is press-fitted and fixed to stub second large-diameter step section 8d of stub shaft 8 positioned in the vehicle body front side with respect to press collar 26. Furthermore, press collar 26 is accompanied by an annular seal member 28 disposed between an inner peripheral surface of press collar 26 and an outer peripheral surface of stub middle-diameter step section 8e of stub shaft 8. Annular seal member 28 is made of a rubber, has an annular shape, and includes a core embedded inside the annular seal member 28.

Thus, press collar 26 surrounds the second end of dust cover 27 so as to complicate an intrusion route of muddy water etc. toward the outer peripheral surface of stub middle-diameter step section 8e of stub shaft 8. This establishes a so-called labyrinth seal, and suppresses muddy water etc. from intruding to the outer peripheral surface of stub middle-diameter step section 8e. Furthermore, annular seal member 28 is disposed between the inner peripheral surface of press collar 26 and the outer peripheral surface of stub middle-diameter step section 8e. This suppresses muddy water etc. from intruding from the front of the vehicle body into an interior of center bearing 19.

Center bearing 19 is at an axial position determined and fixed by a retainer 29 press-fitted to the outer periphery of stub middle-diameter section 8b of stub shaft 8. As shown in FIG. 3, retainer 29 is formed by bending a thin metal plate by press-forming so as to have a substantially U-shaped section, and includes a first end 29a and a second end 29b. First end 29a of retainer 29 is press-fitted to the outer peripheral surface of stub middle-diameter section 8b. Second end 29b of retainer 29 extends radially from a rear edge of first end 29a, and is bent from there toward center bearing 19 like a turn-up.

First end 29a of retainer 29 has a substantially cylindrical shape, and includes a tip part 29c disposed adjacently to center bearing 19 and bent diameter-increasingly. Tip part 29c includes a tip edge 29d being in axial contact with a first side surface 21a of inner ring 21 of center bearing 19. Thus, tip edge 29d and step surface 8f sandwich the inner ring 21 therebetween. This fixes inner ring 21 of center bearing 19 in the axial direction, and firmly retains an entire of center bearing 19.

Second end 29b of retainer 29 is composed of a bent part 29e and a cylindrical part 29f. Bent part 29e is bent radially outwardly. Cylindrical part 29f extends from an outer peripheral edge of bent part 29e toward outer ring 22 of center bearing 19. Bent part 29e and cylindrical part 29f surround small-diameter annular section 18c of inner collar 18 so as to shield the interior of center bearing 19.

Thus, second end 29b of retainer 29 surrounds an outer periphery of small-diameter annular section 18c of inner collar 18. This complicates an intrusion route into the interior of center bearing 19, and establishes a so-called labyrinth seal. This suppresses muddy water etc. from intruding from a rear of the vehicle body into the interior of center bearing 19.

This labyrinth seal suppressing muddy water etc. from intruding from the rear of the vehicle body allows omission of an annular seal member to be disposed between small-diameter annular section 18c of inner collar 18 and second end 29b of retainer 29 for suppressing muddy water etc. from intruding into the interior of center bearing 19.

The propeller shaft configured as described above includes the labyrinth seal formed by dust cover 27 and press collar 26 surrounding the second end of dust cover 27. However, this labyrinth seal includes a gap between the second end of dust cover 27 and an interior wall of press collar 26, and may fail to prevent muddy water having flown toward the gap from intruding into the interior of center bearing 19.

For example, in case of muddy water etc. having flown into the opening of press collar 26 shown in FIG. 2 at an oblique velocity, the muddy water etc. may intrude into the interior of center bearing 19 through the gap between the second end of dust cover 27 and the interior wall of press collar 26.

First Embodiment

In view of the foregoing, the first embodiment is configured to dispose a water-shielding cover at a position to face the opening of the press collar of the propeller shaft (i.e., the press collar of the stub shaft) across the dust cover. The water-shielding cover includes an opening extending to approach the opening of the press collar.

Thus, the water-shielding cover is fixed at the position to face the opening of the press collar of the stub shaft, and includes the opening that extends to approach the opening of the press collar within a range not to contact with the opening of the press collar. This water-shielding cover suppresses intrusion of muddy water etc. via the opening of the press collar even in case of muddy water etc. having obliquely flown toward the opening of the press collar, and thereby suppresses intrusion of muddy water etc. into the interior of the center bearing.

Figure 4:
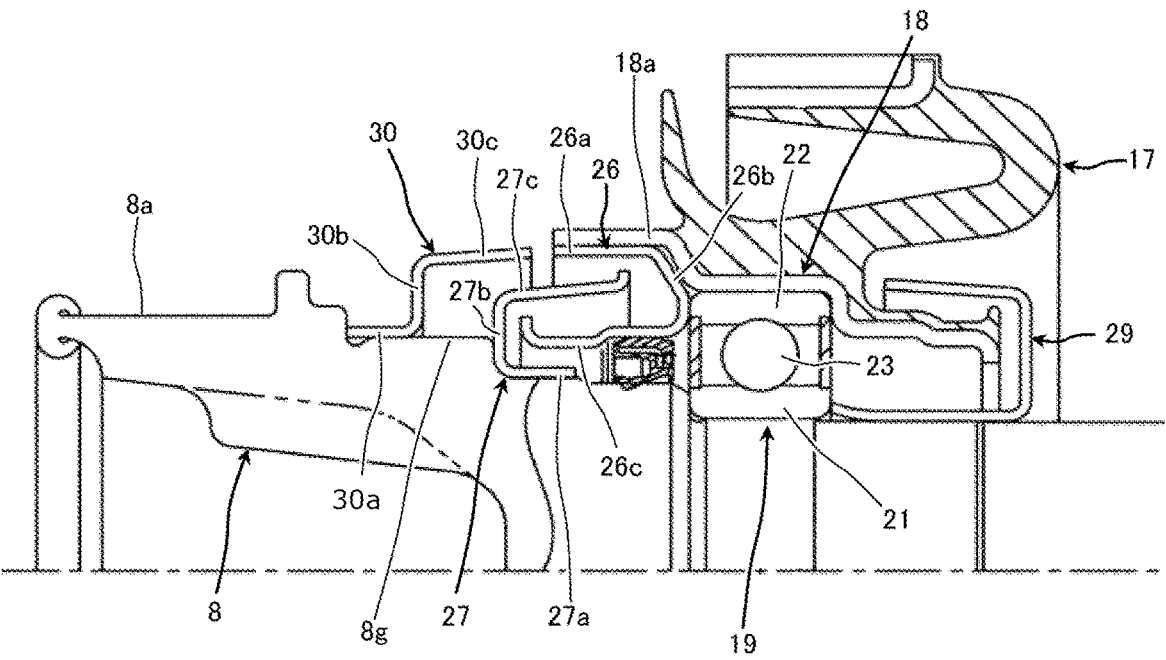
FIG. 4 is a longitudinal sectional view of a supporter for the propeller shaft and a vicinity thereof according to a first embodiment of the present invention.
Figure 5:
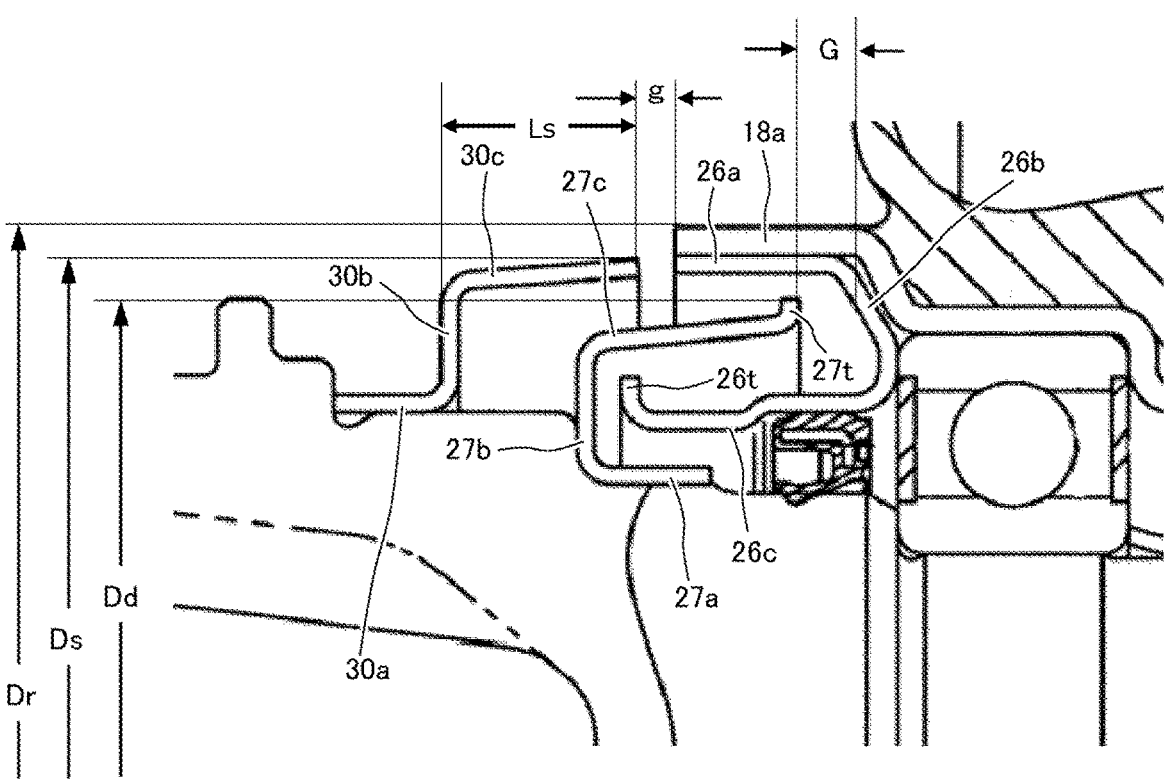
FIG. 5 is an enlarged longitudinal sectional view enlarging the supporter for the propeller shaft and the vicinity thereof shown in FIG. 4.

The following details the first embodiment of the present invention with reference to FIGS. 4 and 5. The drawings show reference numerals closely related to the present embodiment while omitting other reference numerals not closely related to the present embodiment. The omitted reference numerals are shown in FIGS. 2 and 3. FIG. 4 shows configurations involving a supporter of the propeller shaft. FIG. 5 enlarges a part of FIG. 4.

As shown in FIGS. 4 and 5, when viewed at a section parallel with the rotational axis of stub shaft 8, press collar 26 is composed of three parts, i.e., a first annular part 26*a*, a second annular part 26*b* formed continuously with first annular part 26*a*, and a third annular part 26*c* formed continuously with second annular part 26*b*.

First annular part 26*a* is press-fitted in and fixed to large-diameter annular section 18*a* of inner collar 18. Second annular part 26*b* extends toward stub shaft 8, and prevents outer ring 22 of center bearing 19 from moving left in the drawing, i.e., moving toward dust cover 27. Third annular part 26*c* extends to go away from center bearing 19, and prevents annular seal member 28 from moving in the axial direction and/or the radial direction.

First annular part 26*a*, second annular part 26*b*, and second annular part 26*b* form a substantially U-shaped section. First annular part 26*a* and third annular part 26*c* define the opening extending along the rotational axis of stub shaft 8. Each of first annular part 26*a* and third annular part 26*c* extends in a direction to go away from center bearing 19.

Dust cover 27 is composed of three parts, i.e., a cover first part 27*a*, a cover second part 27*b* formed continuously with cover first part 27*a*, and a cover third part 27*c* formed continuously with cover second part 27*b*. Dust cover 27 is disposed oppositely to center bearing 19 across press collar 26.

Cover first part 27*a* is press-fitted in and fixed to stub second large-diameter step section 8*d* of stub shaft 8. Cover second part 27*b* extends outwardly in the radial direction with respect to the rotational axis of stub shaft 8. Cover third part 27*c* is shaped to gradually expand, i.e., gradually increase in outer diameter, in a direction to go away from the rotational axis of stub shaft 8 in the radial direction.

Cover first part 27*a*, cover second part 27*b*, and cover third part 27*c* form a substantially U-shaped section. Cover first part 27*a* and cover third part 27*c* define the opening extending along the rotational axis of stub shaft 8. Each of cover first part 27*a* and cover third part 27*c* extends toward center bearing 19.

As shown in FIG. 4, the opening of press collar 26 and the opening of dust cover 27 are disposed to face each other. Third annular part 26*c* and cover third part 27*c* extend in spaces defined by these openings.

In other words, the opening of press collar 26 formed by first annular part 26*a* and third annular part 26*c* and the opening of dust cover 27 formed by cover first part 27*a* and cover third part 27*c* are disposed face-to-face with each other.

Due to this combination of press collar 26 and dust cover 27, cover third part 27*c* of dust cover 27 extends to the space defined between first annular part 26*a* and third annular part 26*c* in the opening of press collar 26. This establishes a labyrinth formed by second annular part 26*b* of press collar 26 and a tip 27*t* of cover third part 27*c* of dust cover 27.

Similarly, third annular part 26*c* of press collar 26 extends to the space defined between cover first part 27*a* and cover third part 27*c* in the opening of dust cover 27. This establishes a labyrinth formed by cover second part 27*b* of dust cover 27 and a tip 26*t* of third annular part 26*c* of press collar 26.

As described above, cover first part 27*a* of dust cover 27 is bent toward press collar 26 to be fixed to stub shaft 8, differently from dust cover 27 shown in FIG. 2. This serves to shorten dust cover 27 in length in the direction of the rotational axis.

As shown in FIG. 5, tip 27*t* of cover third part 27*c* of dust cover 27 is bent outwardly in the radial direction orthogonal to the rotational axis. This suppresses muddy water flowing on cover third part 27*c* from changing its course and flowing into a gap between tip 27*t* of cover third part 27*c* and second annular part 26*b* of press collar 26.

Similarly, tip 26*t* of third annular part 26*c* of press collar 26 is bent outwardly in the radial direction orthogonal to the rotational axis. This suppresses muddy water flowing on third annular part 26*c* from changing its course and flowing into a gap between tip 26*t* of third annular part 26*c* and cover second part 27*b* of dust cover 27.

The following describes a water-shielding cover 30 characterizing the present embodiment. Water-shielding cover 30 is fixed to stub shaft 8 at a position opposite to press collar 26 across dust cover 27. Water-shielding cover 30 is composed of three parts, i.e., a first water-shielding part 30*a*, a second water-shielding part 30*b* formed continuously with first water-shielding part 30*a*, and a third water-shielding part 30*c* formed continuously with second water-shielding part 30*b*.

First water-shielding part 30*a* is fixed to a stub first large-diameter step section 8*g* of stub shaft 8. Second water-shielding part 30*b* extends outwardly in the radial direction with respect to the rotational axis of stub shaft 8. Third water-shielding part 30*c* is shaped to gradually expand, i.e., gradually increase in outer diameter, in the direction to go away from the rotational axis of stub shaft 8 in the radial direction.

Third water-shielding part 30*c* and the outer peripheral surface of stub shaft 8 form an opening. This opening contains cover second part 27*b* and a part of cover third part 27*c* so as to overlap with them in the direction of the rotational axis. Thus, third water-shielding part 30*c* covers cover second part 27*b* and the part of cover third part 27*c* from outside.

As shown in FIG. 5, third water-shielding part 30*c* is positioned outside with respect to cover third part 27*c* of dust cover 27 in a direction orthogonal to the rotational axis of stub shaft 8. Furthermore, third water-shielding part 30*c* includes an end surface being close to an end surface of first annular part 26*a* of press collar 26 and facing the end surface of first annular part 26*a* across a gap (g).

Third water-shielding part 30*c* partially overlaps with cover third part 27*c* in the direction of the rotational axis of stub shaft 8. Gap (g) is narrower than a gap (G) formed between tip 27*t* of cover third part 27*c* of dust cover 27 and second annular part 26*b* of press collar 26. As shown in FIG. 5, dust cover 27 is covered from outside by both of press collar 26 and water-shielding cover 30.

Furthermore, gap (g) has a length shorter than an axial length Ls of third water-shielding part 30*c* of water-shielding cover 30. This reduces an area of an intrusion route of muddy water upon covering dust cover 27, and thereby reduces a possibility of intrusion of muddy water via the opening of press collar 26.

Since water-shielding cover 30 is disposed to cover the dust cover 27 from outside, water-shielding cover 30 suppresses intrusion of muddy water etc. via the opening of press collar 26 even in case of muddy water etc. having obliquely flown to the opening of press collar 26. This suppresses intrusion of muddy water etc. into the interior of the center bearing.

The following describes other characteristic configurations of the present embodiment, with reference to FIG. 5.

In a direction orthogonal to the rotational axis of stub shaft 8, third water-shielding part 30c overlapping with cover third part 27c has a maximum outer diameter Ds that is approximately equal to or less than a maximum outer diameter Dr of large-diameter annular section 18a of inner collar 18. In other words, the maximum outer diameter Ds of third water-shielding part 30c of water-shielding cover 30 is set to a length that does not exceed the maximum outer diameter Dr of large-diameter annular section 18a of inner collar 18. Accordingly, water-shielding cover 30 does not interfere upon welding the stub shaft 8 to driving-side tube 6.

In the direction orthogonal to the rotational axis of stub shaft 8, the maximum outer diameter Ds of third water-shielding part 30c is less than the maximum outer diameter Dr of large-diameter annular section 18a of inner collar 18, and is greater than a maximum outer diameter Dd of dust cover 27. This serves to suppress intrusion of muddy water.

In the direction orthogonal to the rotational axis of stub shaft 8, third water-shielding part 30c of water-shielding cover 30 gradually increases in outer diameter as approaching the center bearing 19. This facilitates discharge of muddy water with centrifugal force in case of muddy water intrusion into water-shielding cover 30.

For the same reason, in the direction orthogonal to the rotational axis of stub shaft 8, cover third part 27c of dust cover 27 gradually increases in outer diameter as approaching the center bearing 19.

Cover third part 27c of dust cover 27 includes tip 27t turned up toward the outside, i.e., formed to extend outwardly in the radial direction orthogonal to the rotational axis of stub shaft 8. This suppresses muddy water flowing on cover third part 27c from changing its course and flowing into the gap between tip 27t of cover third part 27c and second annular part 26b of press collar 26.

First water-shielding part 30a of water-shielding cover 30 extends to go away from dust cover 27, and is fixed to stub shaft 8. Third water-shielding part 30c of water-shielding cover 30 extends to approach dust cover 27. Thus, water-shielding cover 30 has a section substantially having a shape of a reversed Z in the drawing. This allows third water-shielding part 30c of water-shielding cover 30 to be formed to overlap with cover third part 27c of dust cover 27, with a reduced material.

Cover first part 27a of dust cover 27 is fixed to stub shaft 8. Each of cover first part 27a and cover third part 27c extends toward press collar 26. Thus, dust cover 27 has the substantially U-shaped section. This serves to reduce an axial length of stub shaft 8.

Stub shaft 8 includes a step that receives a radially-spreading surface of water-shielding cover 30 after water-shielding cover 30 has been installed. This step is formed by stub first large-diameter step section 8g so as to extend in the radial direction, and serves for certain positioning and fixing of water-shielding cover 30.

Stub shaft 8 includes stub first large-diameter step section 8g and stub second large-diameter step section 8d less in outer diameter than stub first large-diameter step section 8g. Water-shielding cover 30 is fixed to stub first large-diameter step section 8g. Dust cover 27 is fixed to stub second large-diameter step section 8d. Stub first large-diameter step section 8g and stub second large-diameter step section 8d have a step therebetween. This serves for certain positioning and fixing of dust cover 27.

Third annular part 26c of press collar 26 radially presses annular seal member 28 disposed on the outer peripheral surface of stub shaft 8. This regulates movement of annular seal member 28, and improves sealability thereof.

Second Embodiment

Figure 6:
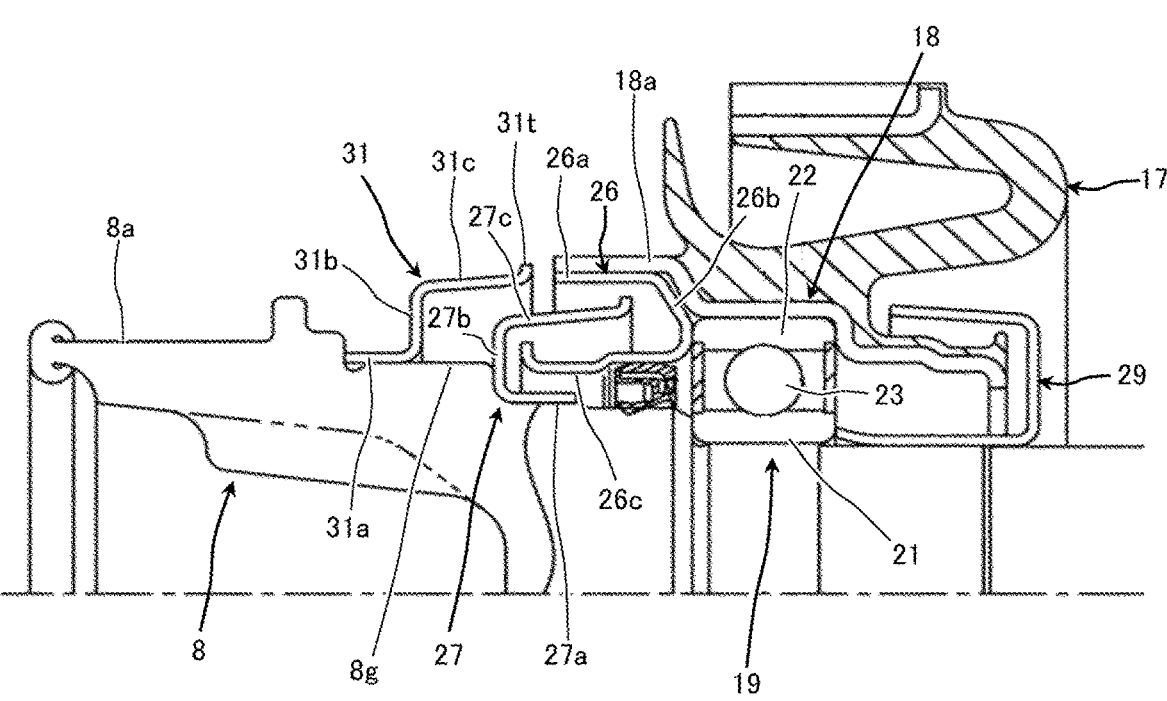
FIG. 6 is a longitudinal sectional view of a supporter for the propeller shaft and a vicinity thereof according to a second embodiment of the present invention.

The following describes the second embodiment of the present invention, with reference to FIG. 6. The second embodiment presents a modification in a shape of a tip of a third water-shielding part 31c of a water-shielding cover 31. The same components with those in FIGS. 4 and 5 are represented by the same reference numerals, explanations of which are omitted.

In FIG. 6, the tip of cover third part 27c of dust cover 27 is formed as tip 27t extending outwardly in the direction orthogonal to the rotational axis of stub shaft 8 as shown in FIG. 5. Similarly, the tip of third water-shielding part 31c of water-shielding cover 31 is formed as a tip 31t extending outwardly in the direction orthogonal to the rotational axis of stub shaft 8.

Thus, even in case of muddy water etc. having obliquely flown to the opening of press collar 26, tip 31t of third water-shielding part 31c of water-shielding cover 31 changes a movement direction of the muddy water etc. to the radial direction. This suppresses intrusion of muddy water etc. via the opening of press collar 26, and thereby suppresses intrusion of muddy water etc. into the interior of the center bearing.

Third Embodiment

Figure 7:
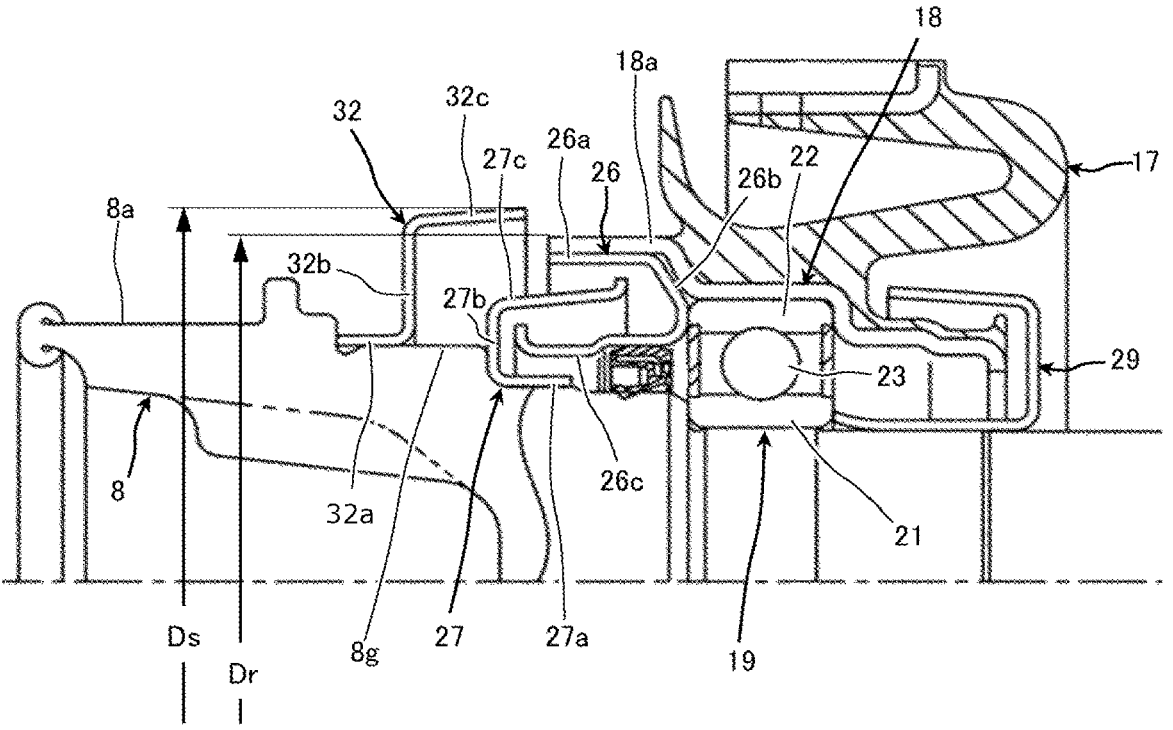
FIG. 7 is a longitudinal sectional view of a supporter for the propeller shaft and a vicinity thereof according to a third embodiment of the present invention.

The following describes the third embodiment of the present invention, with reference to FIG. 7. The third embodiment presents a modification to set a maximum outer diameter of a third water-shielding part 32c of a water-shielding cover 32 to be greater than the maximum outer diameter of large-diameter annular section 18a of inner collar 18. The same components with those in FIGS. 4 and 5 are represented by the same reference numerals, explanations of which are omitted.

As shown in FIG. 7, in the direction orthogonal to the rotational axis of stub shaft 8, the maximum outer diameter Ds of third water-shielding part 32c overlapping with cover third part 27c is approximately equal to or greater than the maximum outer diameter Dr of large-diameter annular section 18a of inner collar 18. In other words, the maximum outer diameter Ds of third water-shielding part 32c of water-shielding cover 32 is set to a length that exceeds the maximum outer diameter Dr of large-diameter annular section 18a of inner collar 18.

Thus, third water-shielding part 32c of water-shielding cover 32 covers dust cover 27 from outside. This suppresses, even in case of muddy water etc. having obliquely flown to the opening of press collar 26, intrusion of muddy water etc. via the opening of press collar 26, and thereby suppresses intrusion of muddy water etc. into the interior of the center bearing.

Fourth Embodiment

Figure 8:
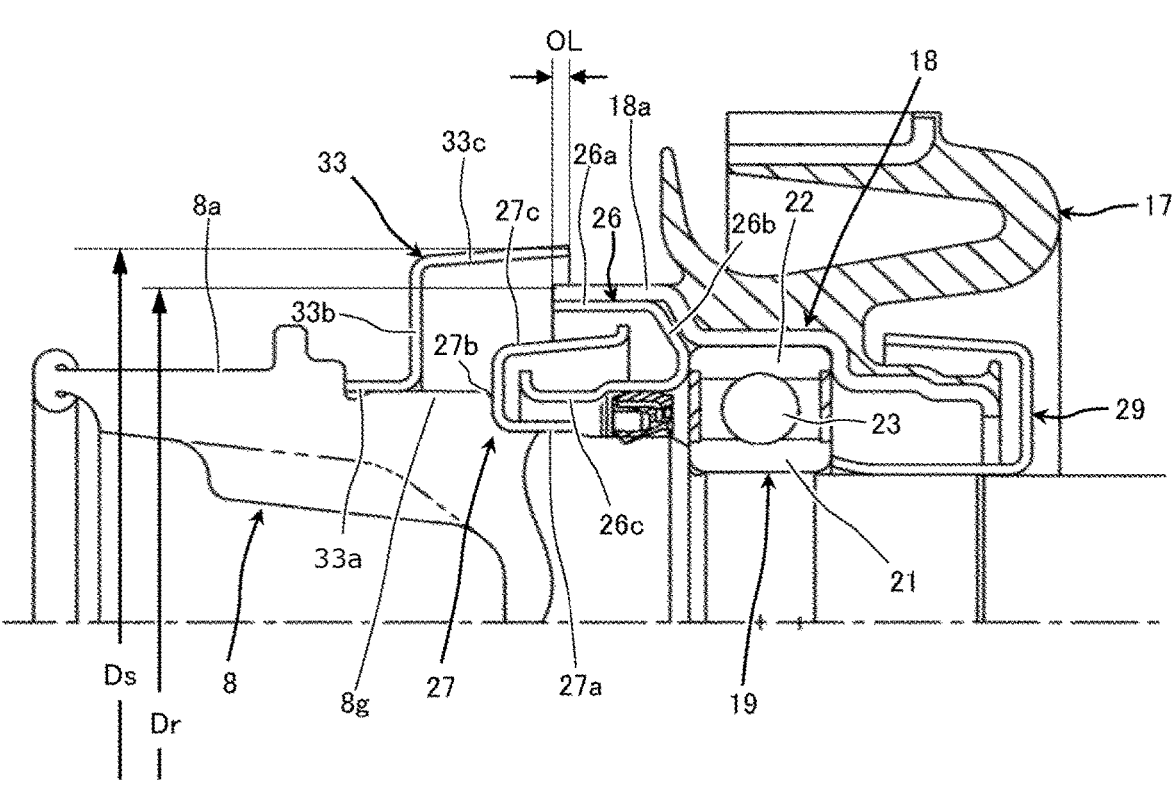
FIG. 8 is a longitudinal sectional view of a supporter for the propeller shaft and a vicinity thereof according to a fourth embodiment of the present invention.

The following describes the fourth embodiment of the present invention, with reference to FIG. 8. The fourth embodiment presents a modification to set a maximum outer diameter of a third water-shielding part 33*c* of a water-shielding cover 33 to be greater than the maximum outer diameter of large-diameter annular section 18*a* of inner collar 18, and furthermore a modification to set the third water-shielding part 33*c* to extend to large-diameter annular section 18*a* of inner collar 18. The same components with those in FIGS. 4 and 5 are represented by the same reference numerals, explanations of which are omitted.

As shown in FIG. 8, in the direction orthogonal to the rotational axis of stub shaft 8, the maximum outer diameter Ds of third water-shielding part 33*c* overlapping with cover third part 27*c* is approximately equal to or greater than the maximum outer diameter Dr of large-diameter annular section 18*a* of inner collar 18. In other words, the maximum outer diameter Ds of third water-shielding part 33*c* of water-shielding cover 33 is set to a length that exceeds the maximum outer diameter Dr of large-diameter annular section 18*a* of inner collar 18.

Furthermore, third water-shielding part 33*c* extends toward center bearing 19 beyond an end face of large-diameter annular section 18*a* of inner collar 18 and an end face of first annular part 26*a* of press collar 26. The tip of third water-shielding part 33*c* of water-shielding cover 33 and the end faces of large-diameter annular section 18*a* of inner collar 18 and first annular part 26*a* of press collar 26 form an overlap region OL therebetween.

Thus, third water-shielding part 33*c* serves as a cover extending beyond the end face of large-diameter annular section 18*a* of inner collar 18 and the end face of first annular part 26*a* of press collar 26. This suppresses, even in case of muddy water etc. having obliquely flown to the opening of press collar 26, intrusion of muddy water etc. via the opening of press collar 26, and thereby suppresses intrusion of muddy water etc. into the interior of the center bearing.

Fifth Embodiment

Figure 9:
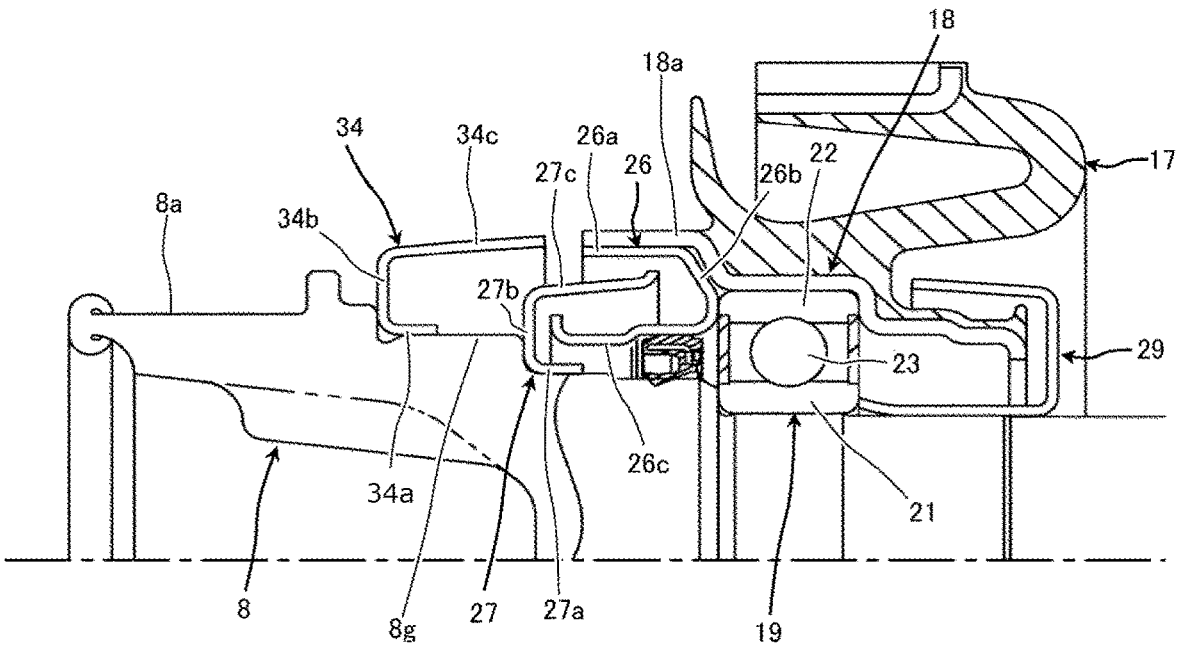
FIG. 9 is a longitudinal sectional view of a supporter for the propeller shaft and a vicinity thereof according to a fifth embodiment of the present invention.

The following describes the fifth embodiment of the present invention, with reference to FIG. 9. The fifth embodiment presents a modification to form a first water-shielding part 34*a* of a water-shielding cover 34 to extend toward press collar 26. The same components with those in FIGS. 4 and 5 are represented by the same reference numerals, explanations of which are omitted.

According to the embodiments described above, each of water-shielding covers 30 to 33 includes a corresponding one of first water-shielding parts 30*a* to 33*a* extending in the direction opposite to the direction toward press collar 26, and includes a corresponding one of third water-shielding parts 30*c* and 33*c* extending in the direction toward press collar 26, and has a section substantially having the shape of reversed Z in the drawing.

According to the fifth embodiment, as shown in FIG. 9, first water-shielding part 34*a* of water-shielding cover 34 is fixed to stub shaft 8, and first water-shielding part 34*a* and a third water-shielding part 34*c* of water-shielding cover 34 both extend toward press collar 26 such that water-shielding cover 34 has a substantially U-shaped section. This serves to reduce stub shaft 8 in axial length.

Sixth Embodiment

Figure 10:
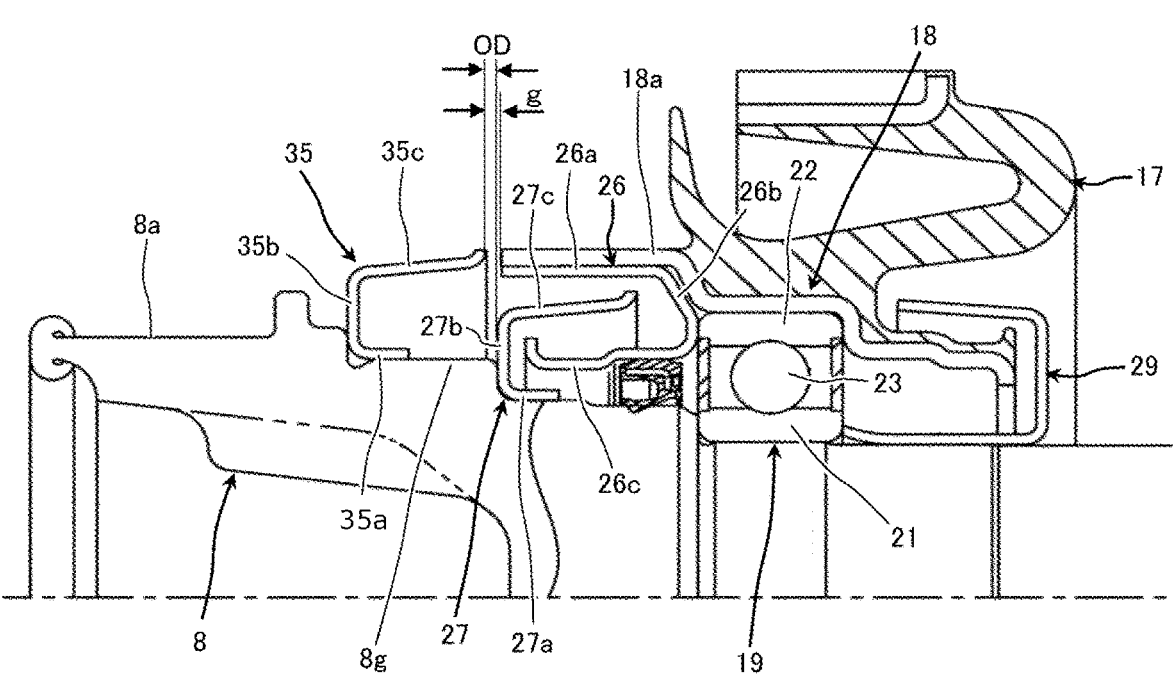
FIG. 10 is a longitudinal sectional view of a supporter for the propeller shaft and a vicinity thereof according to a sixth embodiment of the present invention.

The following describes the sixth embodiment of the present invention, with reference to FIG. 10. The sixth embodiment presents a modification to position a water-shielding cover 35 farther from press collar 26 and form a gap between a tip of a third water-shielding part 35*c* of water-shielding cover 35 and an end face of cover second part 27*b* of dust cover 27 facing water-shielding cover 35, such that water-shielding cover 35 and dust cover 27 do not overlap with each other. The same components with those in FIGS. 4 and 5 are represented by the same reference numerals, explanations of which are omitted.

According to the embodiments described above, each of water-shielding covers 30 to 34 partially overlaps with dust cover 27 in the direction of the rotational axis of stub shaft 8.

According to the sixth embodiment, water-shielding cover 35 and dust cover 27 do not overlap with each other since water-shielding cover 35 is positioned farther from dust cover 27 so as to form gap (OD) between the tip of third water-shielding part 35*c* of water-shielding cover 35 and the end face of cover second part 27*b* of dust cover 27 facing water-shielding cover 35.

Third water-shielding part 35*c* extends along stub shaft 8 toward dust cover 27, to a position before reaching the cover second part 27*b* of dust cover 27. The tip of third water-shielding part 35*c* closely faces the end face of first annular part 26*a* of press collar 26. Gap (OD) is narrower than gap (g) shown in FIG. 5. In addition, the end face of first annular part 26*a* of press collar 26 and the end face of cover second part 27*b* of dust cover 27 are substantially same with each other in position in the direction of the rotational axis of stub shaft 8.

Third water-shielding part 35*c* of water-shielding cover 35 has a shape same with third water-shielding part 31*c* of water-shielding cover 31 shown in FIG. 6. Specifically, third water-shielding part 35*c* includes a tip turned up to the outside, i.e., formed to extend outwardly in the radial direction with respect to the rotational axis of stub shaft 8.

A first water-shielding part 35*a* of water-shielding cover 35 has a shape same with first water-shielding part 34*a* of water-shielding cover 34 shown in FIG. 9. Specifically, when viewed in the direction of the rotational axis of stub shaft 8, first water-shielding part 35*a* and third water-shielding part 35*c* both extend toward press collar 26 such that water-shielding cover 35 has a substantially U-shaped section.

Although water-shielding cover 35 and dust cover 27 do not overlap with each other in the direction of the rotational axis of stub shaft 8, water-shielding cover 35 covers the opening of press collar 26 from outside, and suppresses, even in case of muddy water etc. having obliquely flown to the opening of press collar 26, intrusion of muddy water etc. via the opening of press collar 26, and thereby suppresses intrusion of muddy water etc. into the interior of the center bearing.

As described above, the present invention provides a configuration to dispose, in addition to the dust cover, a water-shielding cover that is positioned to face the opening of the press collar in the propeller shaft and includes an opening extending to approach the opening of the press collar.

According to this configuration, the water-shielding cover is fixed to the position to face the opening of the press collar on the stub shaft, and the opening of the water-shielding cover extends toward the opening of the press collar. This suppresses intrusion of muddy water etc. via the opening of press collar 26 even in case of muddy water etc. having obliquely flown to the opening of press collar 26, and thereby suppresses intrusion of muddy water etc. into the interior of the center bearing.

The present invention is not limited to the embodiments described above, and includes various modifications. Each of the above embodiments describes detailed configurations merely for clarity of the present invention, and the present invention is not limited to one satisfying all of the described configurations. Furthermore, it is allowed to replace a partial configuration in one embodiment with that in another embodiment, and/or add a partial configuration of one embodiment to configurations in another embodiment. Each embodiment allows addition, deletion, and/or replacement of configurations.

The invention claimed is:

1. A propeller shaft for transmitting drive force from a drive source, the propeller shaft comprising:

a shaft including a first end and a second end;

a center bearing including: an inner ring fixed to an outer peripheral surface of the shaft; a rolling body disposed in an outer circumferential side with respect to the inner ring; and an outer ring disposed in an outer circumferential side with respect to the rolling body;

an inner collar that has a tubular shape, and extends along a rotational axis of the shaft so as to surround the outer peripheral surface of the shaft, and retains the outer ring of the center bearing;

a press collar including a first annular part, a second annular part, and a third annular part, wherein: the first annular part is disposed in an annular gap formed between the outer peripheral surface of the shaft and an inner peripheral surface of the inner collar, and is fixed to the inner peripheral surface of the inner collar, and extends in a direction to approach the center bearing along the shaft, when viewed in a direction of the rotational axis of the shaft; the second annular part extends continuously with the first annular part, in a direction to approach the shaft;

and the third annular part extends continuously with the second annular part, in a direction to go away from the center bearing along the shaft; and a dust cover including a cover first part, a cover second part, and a cover third part, wherein: the cover first part is disposed on the outer peripheral surface of the shaft oppositely to the center bearing across the press collar, and is fixed to the outer peripheral surface of the shaft, and extends in a direction to approach the press collar along the shaft, when viewed in the direction of the rotational axis of the shaft; the cover second part extends continuously with the cover first part, in a direction to go away from the shaft; and the cover third part extends continuously with the cover second part, in a direction to approach the press collar along the shaft, wherein:

the cover third part of the dust cover extends to a space defined between the first annular part and the third annular part of the press collar;

the third annular part of the press collar extends to a space defined between the cover first part and the cover third part of the dust cover;

the propeller shaft further includes a water-shielding cover including a first water-shielding part, a second water-shielding part, and a third water-shielding part, wherein:

the first water-shielding part is disposed on the outer peripheral surface of the shaft oppositely to the press collar across the dust cover, and is fixed to the outer peripheral surface of the shaft, and extends along the shaft, when viewed in the direction of the rotational axis of the shaft;

the second water-shielding part extends continuously with the first water-shielding part, in a direction to go away from the shaft; and the third water-shielding part extends continuously with the second water-shielding part, in a direction to approach the dust cover along the shaft, and partially covers the cover second part and the cover third part of the dust cover from outside; and the third water-shielding part of the water-shielding cover is approximately equal to or less than the inner collar in maximum outer diameter.

2. The propeller shaft as claimed in claim 1, wherein the third water-shielding part of the water-shielding cover is less than the inner collar and greater than the dust cover in maximum outer diameter.

3. The propeller shaft as claimed in claim 1, wherein the third water-shielding part of the water-shielding cover is shaped to gradually expand to go away from the rotational axis of the shaft.

4. The propeller shaft as claimed in claim 1, wherein the cover third part of the dust cover is shaped to gradually expand to go away from the rotational axis of the shaft.

5. The propeller shaft as claimed in claim 1, wherein the third water-shielding part of the water-shielding cover extends to approach the dust cover, and the first water-shielding part of the water-shielding cover extends to go away from the dust cover.

6. The propeller shaft as claimed in claim 1, wherein each of the cover first part and the cover third part of the dust cover extends toward the press collar.

7. The propeller shaft as claimed in claim 1, wherein the shaft includes a step that receives a radial surface of the water-shielding cover.

8. The propeller shaft as claimed in claim 1, wherein:

the shaft includes a first outer diameter section and a second outer diameter section less in outer diameter than the first outer diameter section;

the water-shielding cover is fixed to the first outer diameter section;

the center bearing is fixed to the second outer diameter section; and the dust cover is fixed to a section of the shaft between the first outer diameter section and the second outer diameter section.

9. The propeller shaft as claimed in claim 1, the propeller shaft further comprising:

an annular seal member disposed between the outer peripheral surface of the shaft and the third annular part of the press collar.

10. The propeller shaft as claimed in claim 1, wherein the propeller shaft satisfies a condition A or B, where: the condition A is that the cover third part of the dust cover includes a tip extending outwardly in a direction orthogonal to the rotational axis of the shaft; and the condition B is that the third water-shielding part of the water-shielding cover includes a tip extending outwardly in the direction orthogonal to the rotational axis of the shaft.

11. The propeller shaft as claimed in claim 1, wherein each of the first water-shielding part and the third water-shielding part of the water-shielding cover extends to approach the dust cover.

12. The propeller shaft as claimed in claim 1, wherein, in the direction of the rotational axis of the shaft, the third water-shielding part of the water-shielding cover has a length longer than a length between a tip of the third water-shielding part and a tip of the first annular part of the press collar that face each other.

13. The propeller shaft as claimed in claim 12, wherein the propeller shaft satisfies a condition A or B, where: the condition A is that the cover third part of the dust cover includes a tip extending outwardly in a direction orthogonal to the rotational axis of the shaft; and the condition B is that the third water-shielding part of the water-shielding cover includes a tip extending outwardly in the direction orthogonal to the rotational axis of the shaft.

14. A propeller shaft for transmitting drive force from a drive source, the propeller shaft comprising:
   a shaft including a first end and a second end;
   a center bearing including: an inner ring fixed to an outer peripheral surface of the shaft; a rolling body disposed in an outer circumferential side with respect to the inner ring; and an outer ring disposed in an outer circumferential side with respect to the rolling body;
   an inner collar that has a tubular shape, and extends along a rotational axis of the shaft so as to surround the outer peripheral surface of the shaft, and retains the outer ring of the center bearing;
   a press collar including a first annular part, a second annular part, and a third annular part, wherein: the first annular part is disposed in an annular gap formed between the outer peripheral surface of the shaft and an inner peripheral surface of the inner collar, and is fixed to the inner peripheral surface of the inner collar, and extends in a direction to approach the center bearing along the shaft, when viewed in a direction of the rotational axis of the shaft; the second annular part extends continuously with the first annular part, in a direction to approach the shaft; and the third annular part extends continuously with the second annular part, in a direction to go away from the center bearing along the shaft; and
   a dust cover including a cover first part, a cover second part, and a cover third part, wherein: the cover first part is disposed on the outer peripheral surface of the shaft oppositely to the center bearing across the press collar, and is fixed to the outer peripheral surface of the shaft, and extends in a direction to approach the press collar along the shaft, when viewed in the direction of the rotational axis of the shaft; the cover second part extends continuously with the cover first part, in a direction to go away from the shaft; and the cover third part extends continuously with the cover second part, in a direction to approach the press collar along the shaft, wherein:
      the cover third part of the dust cover extends to a space defined between the first annular part and the third annular part of the press collar;
      the third annular part of the press collar extends to a space defined between the cover first part and the cover third part of the dust cover;
      the propeller shaft further includes a water-shielding cover including a first water-shielding part, a second water-shielding part, and a third water-shielding part, wherein: the first water-shielding part is disposed on the outer peripheral surface of the shaft oppositely to the press collar across the dust cover, and is fixed to the outer peripheral surface of the shaft, and extends along the shaft, when viewed in the direction of the rotational axis of the shaft;

the second water-shielding part extends continuously with the first water-shielding part, in a direction to go away from the shaft; and the third water-shielding part extends continuously with the second water-shielding part, in a direction toward the dust cover along the shaft, to a position before reaching the cover second part of the dust cover; and
      the third water-shielding part of the water-shielding cover is approximately equal to or less than the inner collar in maximum outer diameter.

15. The propeller shaft as claimed in claim 14, wherein the third water-shielding part of the water-shielding cover is greater than the cover third part of the dust cover in maximum outer diameter.

16. A propeller shaft for transmitting drive force from a drive source, the propeller shaft comprising:
   a shaft;
   a bearing having an annular shape and including: an inner ring fixed to an outer peripheral surface of the shaft; and an outer ring, wherein a rolling body is disposed between the inner ring and the outer ring;
   an inner collar supported by the outer ring of the bearing, and including a tubular part extending on one side of the bearing in a longitudinal direction of the shaft, wherein an annular gap is formed between the outer peripheral surface of the shaft and an inner peripheral surface of the inner collar;
   a press collar arranged in the annular gap, and including a first end side fixed to the inner peripheral surface of the inner collar, and a second end side forming an annular part extending away from the bearing in the longitudinal direction of the shaft;
   a dust cover including a first end side fixed to the outer peripheral surface of the shaft, and a second end side forming a cover part extending inside the annular part of the press collar; and
   a water-shielding cover including a first end side fixed to the outer peripheral surface of the shaft, and a second end side forming a water-shielding part that extends toward the annular part of the press collar in the longitudinal direction of the shaft and faces an opening formed between the annular part of the press collar and the cover part of the dust cover;
   wherein an end face of the water-shielding cover and an end face of the press collar face each other in proximity with a predetermined clearance therebetween.

17. The propeller shaft as claimed in claim 16, wherein: the water-shielding cover includes:
      a first portion at the first end side;
      a second portion extending radially outwardly with respect to a rotational axis of the shaft; and
      a third portion extending toward the press collar in the longitudinal direction of the shaft; and
   the water-shielding part of the water-shielding cover includes the third portion.

18. The propeller shaft as claimed in claim 16, wherein: the water-shielding cover includes:
      a first portion at the first end side;
      a second portion extending radially outwardly with respect to a rotational axis of the shaft; and
      a third portion extending toward the press collar in the longitudinal direction of the shaft; and
   the water-shielding part of the water-shielding cover includes the second portion.

19. The propeller shaft as claimed in claim 16, wherein the water-shielding cover is formed to partially cover the dust cover from outside.

\* \* \* \* \*